Dec. 27, 1966 W. R. YOUNG, JR 3,294,896

DIGITAL ENCODER FOR FACSIMILE TRANSMISSION

Filed July 24, 1963 3 Sheets-Sheet 1

INVENTOR
W. R. YOUNG, JR.
BY G. E. Hirsch Jr.
ATTORNEY

Dec. 27, 1966 W. R. YOUNG, JR 3,294,896

DIGITAL ENCODER FOR FACSIMILE TRANSMISSION

Filed July 24, 1963 3 Sheets-Sheet 3

United States Patent Office 3,294,896
Patented Dec. 27, 1966

3,294,896
DIGITAL ENCODER FOR FACSIMILE TRANSMISSION

William Rae Young, Jr., Middletown, N.J., assignor to Bell Telephone Laboratories, Incorporated, New York, N.Y., a corporation of New York Filed July 24, 1963, Ser. No. 297,454
11 Claims. (Cl. 178—5)

This invention relates to the transmission of image signals, and more particularly, to the encoding of analog picture signals to permit several discrete intensities to be accommodated by a binary digital transmission system. It has for its principal object the transmission, in binary digital form, of sufficient information to permit shaded areas of an image to be reproduced in a form that subjectively appears shaded.

The transmission of image signals over a relatively narrow bandwidth channel at a relatively slow rate, known commonly as facsimile transmission, can with sufficiently complex coding and decoding apparatus preserve both point-to-point detail and point-to-point intensity variations of a picture. If black and white detail only is meaningful in the reproduction, the encoding and decoding apparatus can be simplified greatly so that picture elements, either full black or full white, may be transmitted using only one bit of picture information per sample. In such a two-state system, those signals developed in scanning an image scene whose amplitudes, representing the intensities of shaded areas in the image, exceed an arbitrary threshold are transmitted as signals of a first state, e.g., *on* pulses, and those signals whose amplitudes fail to exceed the threshold are transmitted as signals of a second state, e.g., *off* pulses. In many applications, for example, printed text, outline maps, and business data, transmission of this sort is quite satisfactory.

For other applications, however, a sacrifice of shading detail cannot be tolerated. Intermediate shades of gray in the picture are essential and must appear in the reproduction. This requirement is generally met by utilizing more than one bit per sample. With pulses of several amplitudes, specific shades of gray may be fully specified, but the required coding-decoding apparatus is more complex, the transmission channel requirements may be somewhat more stringent, the transmission rate may be even slower, and bit-group synchronization may be required.

It is another object of the present invention to resolve this seeming conflict, namely, the conflict between the desirability of a multilevel image reproduction versus the requirement that simple apparatus only be used to accommodate a binary signal picture representation. It is another object of the invention, therefore, to develop a multilevel reproduced image from a binary signal used to represent one picture bit per sample. The solution is based upon the observation that intermediate shades rarely represent fine detail in a picture or map, and may be conveyed with considerably less accuracy of position and extent than is required for fine detail.

In accordance with the invention, these and other objects are attained by encoding shaded areas of an image scene in binary form for reproduction as a field of black dots. By suitably selecting the dot pattern and varying it for different shades of gray, the reproduction is made subjectively to appear as a half-tone image. With several distinct shades of gray, the reproduced picture is of course more nearly a facsimile of the original. Yet with the coding program of the invention, the bit rate is equivalent to that for binary reproduction and utilizes only relative simple coding apparatus. In realizing these objectives, the threshold, ordinarily used to allocate signals to the black or white category in a binary transmission system, is periodically adjusted according to a pre-established schedule so that gray information, intermediate to the absolute black and white levels, is transmitted as a sequence of regular, short, pulses of black amplitude.

It is thus another object of the invention to encode shaded areas of a picture image as a selected sequence of black dots in order that a shaded reproduction may be made with only one bit of picture information per sample, i.e., from a binary digital representation.

Since the coded facsimile signal may be used directly in any facsimile reproducer capable of developing black and white image signals, coding takes place only at the transmitter. In its simplest form, the encoding apparatus of the invention comprises a threshold network for applied video signals, and means for modifying the threshold, either continuously or discontinuously, in time. For example, in a simple illustrative embodiment of the invention, a three-level system, signals developed by a photocell in the facsimile scanner are passed through a two-level threshold network, i.e., a slicer. Signals above the upper threshold are transmitted always as black; signals below the lower threshold are transmitted always as white. Signals whose amplitudes lie between the two threshold levels are termed "gray" signals, and are transmitted after transformation into a sequence of black and white signals according to a prescribed schedule. To do this, a function generator is programmed to develop a square wave of prescribed pulse duration and period. The threshold function signal is combined with the photocell signal, e.g., additively, prior to threshold comparison so that gray area signals are urged into the black region for a specified portion of each prescribed cycle, i.e., for a period determined by the duration of each square wave pulse. During the remaining portion of each cycle, photocell signals which fail to exceed the black threshold are transmitted as white. At the receiver, a half-tone dot pattern is consequently produced, in a conventional reproducer, which subjectively appears gray. By adjusting the duty factor and period of the threshold function signal, the degrees of apparent grayness can be controlled.

In essence, a multiquantizer is adjusted, in accordance with the invention, by an auxiliary pulse sequence to secure one or more additional distinct amplitude ranges which may, nevertheless, be coded with only one bit per sample. Viewing the invention in yet another way, an input signal is modulated by a prescribed pulse sequence so that the number of effective levels of a quantizer is increased.

The invention will be fully apprehended from the following detailed description of an illustrative embodiment thereof taken in connection with the appended drawings in which.

Figure 1:
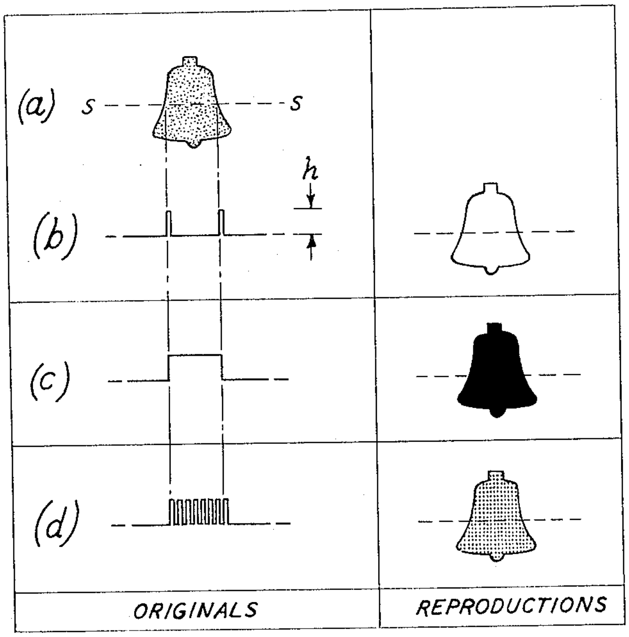
FIG. 1 is an illustration helpful in explaining the invention. It includes at line *a* a representative image scene, and at lines *b* and *c* several binary pulse arrangements used to specify the image for various facsimile reproductions.

FIG. 1 illustrates graphically the encoding technique used to improve facsimile transmission in accordance with the invention. At line *a* there is illustrated a typical picture display which includes black, white, and one shade of gray. In the example, the background is assumed to be at an arbitrary white level, the outline of the pattern at an arbitrary black level, and the area confined by the black outline is assumed to be an even shade of gray. In the printing process used to reproduce the figure, the gray area is necessarily a half-tone print, that is, it is gray by virtue of a random pattern of black dots covering the field. A typical scanning line *s, s* is shown passing through the pattern. In normal facsimile scanning, many such lines parallel to and spaced apart from one another are used to scan the entire pattern. Typically, the intensity of the scanned image, that is, the value of the individual picture element on a scale of gray from white to black is converted into an analog voltage for transmission. In a binary system, only two signal values are permitted, designated respectively black and white. Thus, at line *b* of FIG. 1, the coded representation of scanning line *s, s* in a binary system is shown. In the example, full black signals only give rise to pulses of amplitude *h*. Gray portions of the pattern are arbitrarily assumed to be white. A picture reproduced from a specification of this sort is shown to the right of the wave form of line *b*. An outline only of the original picture is reproduced; the gray area is viewed as white. In line *c*, the threshold between white and black is adjusted to treat the gray area as black. Consequently, the image is reproduced as a full black pattern. Neither the outline figure of line *b* nor the full black reproduction of line *c* depicts the distinctive gray region of the original.

In accordance with the present invention, the gray portion of the original is represented by a pattern of black dots. The resulting scanning line wave form is shown in line *d* for one simple example. A reproduction made from this signal, shown to the right of line *d*, contains a systematic pattern of dots along each line of the scanning pattern. It is obvious that the facsimile picture of line *d* resembles the original far more closely than do either of the other patterns.

In essence, the threshold between white and black in the binary signal of line *d* is modified, in this case discontinuously, in time so that the entire gray area between the solid black pattern outline is represented as a series of black dots in a field of white. On a scheduled basis, typically, the threshold, which normally is at the dark edge of the gray range, is altered for one picture element to the light edge of the gray range. During these intervals, shading which lies within this range will encode as black and is reproduced at the receiver as black. In other intervals such a shade encodes and reproduces as white. If desired, the threshold for one line scan may be followed by several, e.g., three, scan lines in which the function is held constant. On such lines, the shaded areas would be encoded as white. The effect of this schedule is that the shaded area appears in the reproduction as a field in which one of every sixteen picture elements is black. It is thus a lighter shade of gray.

Figure 2:
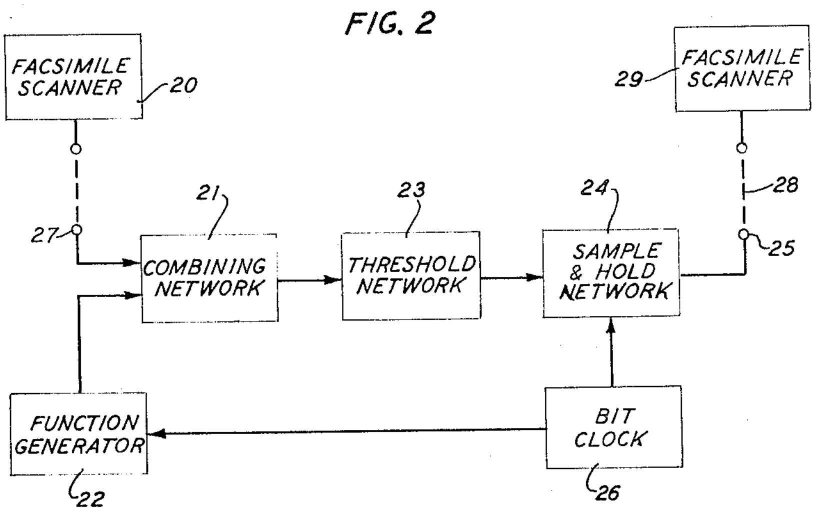
FIG. 2 is a block schematic diagram of an image signal encoder which embodies the principles of the invention.

Encoding apparatus which turns these considerations to account is illustrated in FIG. 2. An analog signal from a facsimile scanner 20 of any desired construction is supplied to combining network 21. This signal is a voltage (or current) representing all shades from pure white to pure black in the picture to be transmitted. A special shaped voltage (or current function) generated by function generator 22 is supplied to a second terminal of combining network 21 and the algebraic combination of the two is supplied to multiple threshold network 23. Threshold network 23 serves to produce one output signal value for any positive input and a second, different, output value for any negative input (absence of positive input). For convenience, the two output signals of network 23 are designated "white" and "black," respectively. These signals serve to actuate sample-and-hold network 24. A sample-and-hold network, which may be a form of multivibrator or the like responds to the magnitude of applied signals at discrete times, generates an output signal of either of two discrete values in response to the sample value, and holds the value, i.e., provides a continuous output, for a prescribed interval. Such apparatus is well known to those skilled in the art. Consequently, a digital signal appears at output terminal 25. The binary states of the digital signal are also designated white and black.

Bit clock 26 controls the timing of the output bit stream and the timing of the function generator 22. The bit time is conveniently established to be one-half of the time required for one complete transition from full white to full black to full white in the scanner and, hence, represents the smallest elemental picture segment that the system can accommodate. In the usual fashion, the granularity of the facsimile image may be controlled by regulating the frequency of the bit clock. Sample-and-hold network 24 is set by the output of the threshold network 23 at the beginning of a bit interval only. Further changes in the threshold network which occur before the beginning of the next bit interval are disregarded. Thus, the output signal from sample-and-hold network 24, which is also the signal that is to be sent over the digital transmission system to the receiver, remains fixed throughout each bit interval. In most practical applications, it is preferable for the bit signal from clock 26, which controls function generator 22, to be out-of-phase with the signal which controls sample-and-hold network 24 so that the steps in the voltage from the function generator will occur at times other than the sampling instants.

Function generator 22 provides the basis for the shading pattern. If the output of the generator is simply a fixed continuous value, one continuous threshold is established in combining network 21, either black or white, so that analog signals from scanner 20 are encoded and appear at output terminal 25 in the form illustrated in FIG. 1 at lines *b* or *c*. Thus, all shades from some value of gray to white are encoded as white and from the same shade of gray to black are encoded as black. As the threshold function signal developed by generator 22 is changed on a programmed basis, the threshold between the light region and the dark region changes and the signal at line *d* of FIG. 1 or some other shading pattern is produced.

Figure 3:
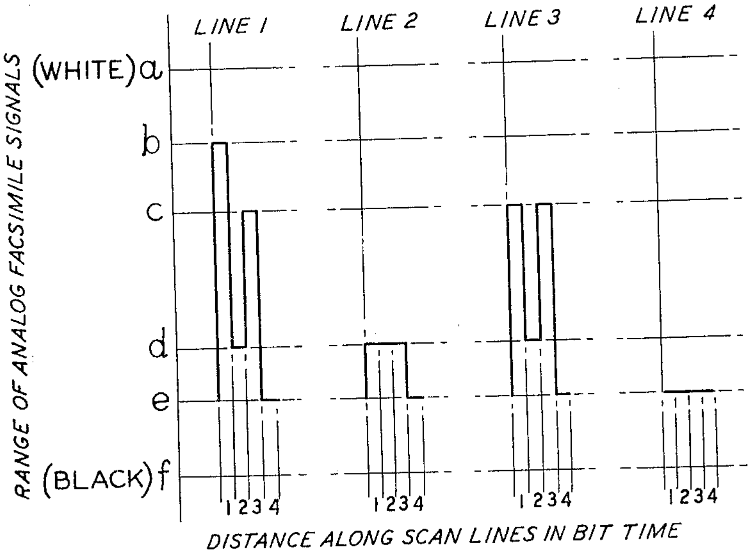
FIG. 3 illustrates various pulse schedules by which different apparent shades of gray may be imparted to a reproduced image signal.

A typical set of threshold patterns which are suitable for developing a multishade reproduction of a multishade original is shown in FIG. 3. For convenience, the threshold patterns (which represent the dynamic threshold values in terms of the scanner output) are the negative of the required threshold signals developed by function generator 22. Further, the illustrated set of patterns is only one of many possible and workable patterns which may be developed within the scope of the invention. In the example of FIG. 3, five different levels of shading (*a–b*, *b–c*, *c–d*, *d–e*, and *e–f*) are possible; each is encoded differently. Region *a–b* is always responsible for a "white" signal, and region *e–f* is always responsible for a "black" signal. The function pattern shown in the figure for each line is repetitive in four bit intervals across that scan line. It differs from line to line and repeats the four line pattern over the entire field.

It will be observed that the threshold function pattern for line 1, as illustrated in FIG. 3, will assure that analog signals which lie above level *b* will encode for bit 1 as a white signal and below level *b* as a black signal. For bit 2, analog signals above level *d* will encode white, below *d* as black; for bit 3 signals above level *c* are white and below *c* are black. For the fourth bit, the threshold is reduced to level *e*. This four bit pattern repeats with the effective threshold at level *b* for bits 1, 5, 9, etc., at level *d* for bits 2, 6, 10, etc., at level *c* for bits 3, 7, 11, etc., and at level *e* for bits 4, 8, 12, etc. A shade between *c* and *d* will thus result in black encoding of every other bit.

Between *d* and *e* black encoding will result for three bits and the fourth bit will encode as white.

For line 2 of the repetitive pattern illustrated in FIG. 3, luevel *d* establishes the threshold for bits 1, 2, and 3, and level *e* for bit 4. For line 3, level *c* establishes the threshold for bits 1 and 3, level *d* for bit 2, and level *e* for bit 4. Level *e* establishes the threshold for bits 1 through 4 in line 4.

Figure 4:
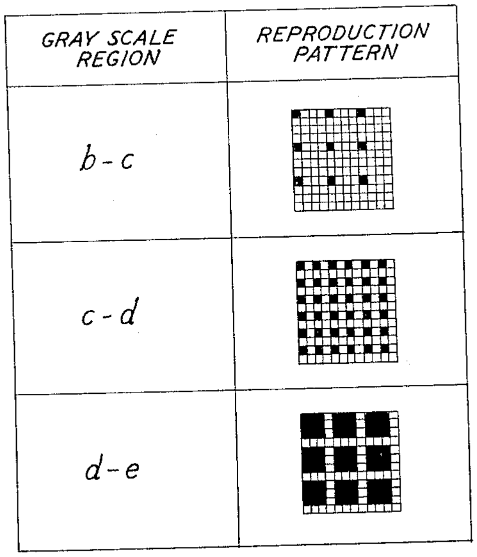
FIG. 4 is an illustration of the reproduced pattern of signals encoded in accordance with the schedules shown in FIG. 3.

The resulting dot patterns for the several regions using the illustrative four line threshold function of FIG. 3 are shown in FIG. 4. Thus, for regions between levels *b* and *c* one bit area in every four is shaded along the line and the pattern occurs every fourth line. For the gray scale region *c–d* every other bit area in every other line is shaded and for region *d–e* three bits of every four in three of every four lines is shaded. The picture elements shown in FIG. 4 are, of course, greatly enlarged for clarity. In practice, the granularity of each of the patterns would be fine compared to the total size of the picture.

This pattern is, of course, merely illustrative of one function pattern according to the invention. Any one line pattern may, of course, be used in consecutive lines, alternate lines, or in general every *n*th line. Further combinations of one or more different patterns may be used in any desired sequence. The complexity of the function generator apparatus depends, of course, upon the number of gray scale levels to be accommodated and the nature of the repetitive pattern used to depict the shade in the reproduced picture.

Figure 5:
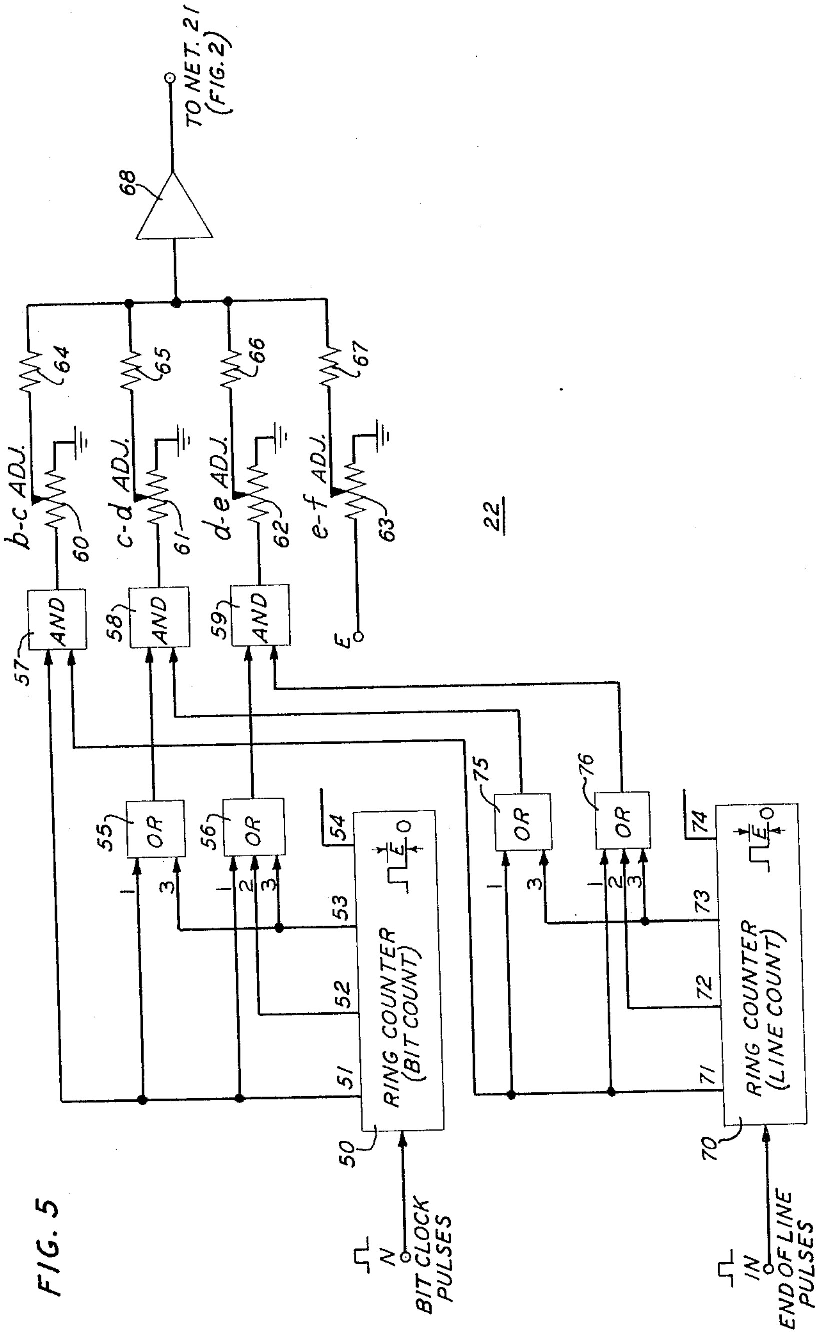
FIG. 5 is a block schematic diagram of a typical function generator used in the apparatus of FIG. 2.

FIG. 5 illustrates a typical function generator (22 in FIG. 2) for developing the four line repetitive pattern with five shades of gray illustrated in FIG. 3. Each clock pulse at the bit rate, e.g., from clock 26 of FIG. 2, energizes ring or step counter 50, of any desired construction, which produces at its four output terminals 51, 52, 53, and 54, a pulse of amplitude E and of approximately bit time duration at successive bit times. Thus, a pulse of amplitude E will appear only at terminal 51 for time 1, only at terminal 52 for time 2, and so on. Pulse signals developed by the ring counter 50 are selectively arranged to energize OR gates 55 and 56, which gates respond if a pulse appears on either one of the energizing inputs. Pulses from counter terminal 51 and OR gates 55 and 56 are selectively applied to AND gates 57, 58, and 59. The AND gates generate an output signal only when both of their inputs are simultaneously energized. When appropriately energized, AND gates 57, 58, and 59 produce a pulse signal which develops a voltage (or current) across potentiometers 60, 61, and 62. Potential E is available across potentiometer 63 at all times. The potentiometers represent, respectively, the amplitude adjustments for gray scale regions *b–c, c–d, d–e,* and *e–f.* They are thus used to adjust the magnitudes of the pulses in the function pattern. By means of resistors 64, 65, 66, and 67, the adjusted voltages from the potentiometers are linearly combined and supplied to amplifier 68 and thence, for example, to the combining network 21 of FIG. 2.

At the end of each scanning line, a signal is developed, generally by the scanning apparatus 20 of FIG. 2, which is used to energize counter 70, provided with four output terminals 71, 72, 73, and 74, and which develops for each line pulse a signal at one of its terminals which persists for the entire line period. Thus for line 1, a pulse signal of amplitude E is available at terminal 71, for the duration of line 2 a pulse is available at terminal 72, and so on. The signal at terminal 71 is applied directly to AND gate 57 and by way of OR gate 75 to AND gate 58 and by way of OR gate 76 to AND gate 59. The signal during line 2 available at terminal 72 is supplied by way of OR gate 76 to AND gate 59, and the pulse which occurs during line 3 is supplied by way of OR gates 75 and 76 respectively to AND gates 58 and 59.

It will be apparent that with this illustrative arrangement (FIG. 5), the function pattern of FIG. 3 is developed. Thus, during line 1 the signal at terminal 71 of ring counter 70 supplies an energizing pulse for AND gates 57, 58, and 59 both directly and by way of the respective OR gates. Further, during bit 1, a signal appears at the second inputs of all three AND gates so that signals appear at all four potentiometers 60 through 63, are combined, and are supplied to amplifier 68. Consequently, the threshold is established at level *b* for bit 1. For bit 2 OR gate 56 only is energized so that AND gate 59 only supplies the signal to potentiometer 62. The threshold for bit 2 is thus established at level *d.* For bit 3 OR gates 55 and 56 are energized so that AND gates 58 and 59 only develop signals in potentiometers 61 and 62. The level for bit 3 is established at level *c.* For bit 4 only potentiometer 63 is energized and the threshold is set at level *e.*

For line 2, OR gate 76 only is energized so that as the sequence of pulses developed by bit counter 51 progresses only AND gate 59 is actuated so that level *d* is established as the threshold for bits 1, 2, and 3 and level *e* for bit 4. Similarly, for line 3 AND gates 58 and 59 only are energized in accordance with the bit count schedule so that the threshold is established at level *c* for bits 1 and 3, at level *d* for bit 2, and at level *e* for bit 4. For line 4 level *e* is established for bits 1 through 4. The next end of line pulse applied to counter 70 will start the cycle over again by producing an energizing signal at terminal 71.

By varying the individual schedule of amplitudes, e.g., by adjusting the potentiometer 60 through 63, and by programming the sequence of events leading to the energization of the potentiometers, a wide variety of dot patterns may be produced. This is possible since the coded signal is an algebraic combination of the analog picture signal and a threshold function pattern. An analog picture signal is in effect modulated by a threshold pattern according to the invention so that a multilevel threshold device can be used to classify a wide range of analog signal amplitudes for binary transmission. Further, because the function generator is solely responsible for the shading pattern in the coded signal, that is, since the dotting is accomplished at the transmitter only, the receiver may operate without modification to yield the desired half-tone reproduction.

Although the invention has been described in terms of a discontinuous threshold function, i.e., sequences of dots of specified densities for specific shades of gray, continuous threshold functions may also be used. For example, continuous sawtooth or triangular waves are entirely suitable. In some instances, it is more convenient to control such a continuous function. Control of the slope of such a wave is all that is necessary to prescribe the width of the dots of the pattern passed by the threshold network. Further, the dot pattern may be conveniently changed from one density to another merely by the regulation of the effective amplitude of the continuous threshold pattern.

The above-described arrangements are, of course, merely illustrative of the application of the principles of the invention. Numerous other arrangements may be devised by those skilled in the art without departing from the spirit and scope of the invention.

What is claimed is:

1. Encoding apparatus for image signals which comprises a source of analog image signals, means for generating threshold function signals, network means supplied with said threshold function signals and with said image signals for algebraically combining said function signals and said image signals, network means including amplitude threshold means for evaluating the amplitude of said combined signals in terms of a prescribed threshold, network means responsive to said evaluation for developing signals of a first binary state for combined signal levels above said prescribed threshold and signals of a second binary state for combined signal levels below said prescribed threshold, and means for coordinating the generation of said threshold function signals and the development of said binary signals.

2. Encoding apparatus for image signals which comprises means for scanning a scene to produce analog image signals, means for generating a periodic threshold function signal, network means for combining said threshold function signal with said image signals, threshold network means supplied with said combined signals for evaluating the amplitude of said combined signal, network means responsive to said evaluation for developing a signal of a first binary state for a combined signal level above a prescribed threshold and a signal of a second binary state for a combined signal level below said prescribed threshold, and timing means for coordinating the generation of said threshold function signal and the development of said binary signal.

3. In a digital facsimile transmission system, a transmitter station, means at said transmitter station for scanning a scene to produce analog image signals, means for establishing timing intervals, means under control of said timing intervals for generating a threshold function signal, network means for combining said threshold function signal with said image signals, network means including amplitude threshold means for evaluating the amplitude of said combined signals as a function of time, network means under control of said timing interval means and responsive to said evaluations for developing signals of a first binary state for combined signal levels above said threshold and signals of a second binary state for combined signal levels below said threshold, a receiver station, and means at said receiver station for utilizing said binary signals for developing a facsimile of said scene.

4. Digital facsimile apparatus which comprises means for scanning a scene to produce analog image signals, means for establishing periodic timing intervals, means under control of said timing intervals for generating a threshold function signal, network means for combining said threshold function signal with said image signals, threshold network means for evaluating the amplitude of said combined signals, network means under control of said timing interval means responsive to said evaluation for developing signals of a first binary state for combined signal levels above a prescribed threshold and signals of a second binary state for combined signal levels below said prescribed threshold, and, at a receiver station, means for utilizing said binary signals for developing a facsimile of said scene.

5. Digital facsimile apparatus as defined in claim 4 wherein said means for generating a threshold function signal includes means for generating a periodic signal which varies according to a prescribed schedule between discrete amplitude levels as a function of time.

6. Digital facsimile apparatus as defined in claim 4 wherein said means for generating a threshold function signal includes means for establishing a signal for each of said timing intervals at one of a selected number of discrete amplitude levels in a periodically repeating pattern.

7. Digital facsimile apparatus as defined in claim 4 wherein said means for generating a threshold function signal includes means for generating a periodic sequence of square waves, each of which persists for substantially one of said timing intervals and each of which is established at one of a number of discrete amplitude levels representative of levels intermediate the levels representative of the maximum and minimum intensities of said analog image signals.

8. Digital facsimile apparatus as defined in claim 4 wherein said means for generating a threshold function signal comprises first counter means energized at said timing intervals for developing during each of said timing intervals a plurality of discrete signals of prescribed amplitude and duration, a first OR gate supplied with the first and third of said developed signals, a second OR gate supplied with the first, second, and third of said developed signals, second counter means energized at the end of each periodic scanning of said scene for developing during the subsequent scanning period a plurality of discrete signals of prescribed amplitude and duration, a third OR gate supplied with the first and third of said signals developed by said second counter, a fourth OR gate supplied with the first, second, and third of the signals developed by said second counter, first AND gate means supplied with the first of said signals developed by said first counter and the first of said signals developed by second counter, a second AND gate supplied with the signal developed by said first OR gate and said third OR gate, a third AND gate supplied with signals developed by said second OR gate and said fourth OR gate, a source of fixed potential, and means for selectively combining signals developed by said first, said second, and said third AND gates with said fixed potential to develop a composite signal.

9. Apparatus for encoding image signals for use in developing a half-tone reproduction of an image which comprises network means supplied with a periodic sequence of signals representative of an image scene for establishing a threshold between signals representative of the brightest portions of said scene and signals representative of the darkest portions of said scene, means for developing an auxiliary pulse sequence in synchronism with the period of said sequence of image signals, means responsive to said auxiliary pulse sequence for periodically adjusting said threshold according to a prescribed schedule, and means responsive to signals supplied by said network means for developing a coded sequence of binary pulses representative thereof.

10. The method of developing a binary signal representative of an image scene that may be used to develop a multishade reproduction of the scene which includes the steps of developing analog signals representative of an image scene, establishing a threshold between two discrete image signal levels, varying the threshold according to a prescribed schedule, utilizing the scheduled threshold to establish two signal level regions, and developing binary signal representations of the two signal regions as a function of time.

11. The method of developing a binary signal representative of an image scene that may be used to develop a multishade reproduction of the scene which includes the steps of scanning a scene to develop analog image signals, developing a threshold function signal whose amplitude is established at selected, discrete, amplitude levels as a function of time in accordance with a prescribed schedule, utilizing said threshold function signal to modulate said analog image signal, thereby to assign applied analog signals to one of two amplitude zones as established by said function signal, and developing a binary signal representation of said assigned signals.

References Cited by the Examiner

UNITED STATES PATENTS

| | | | |
|---|---|---|---|
| 2,569,927 | 10/1951 | Gloess | 178—6 |
| 2,974,195 | 3/1961 | Julesz | 179—15.55 |

DAVID G. REDINBAUGH, *Primary Examiner.*

H. W. BRITTON, *Assistant Examiner.*